(12) United States Patent
Pan

(10) Patent No.: US 10,724,191 B2
(45) Date of Patent: Jul. 28, 2020

(54) MOVABLE CAR ARRESTER MODULE AND CAR ARRESTER

(71) Applicant: NINGBO LIDU POLICE EQUIPMENT TECHNOLOGY CO., LTD., Ningbo (CN)

(72) Inventor: Xuede Pan, Ningbo (CN)

(73) Assignee: NINGBO LIDU POLICE EQUIPMENT TECHNOLOGY CO., LTD, Ningbo (CN)

( * ) Notice: Subject to any disclaimer, the term of this patent is extended or adjusted under 35 U.S.C. 154(b) by 0 days.

(21) Appl. No.: 16/314,392

(22) PCT Filed: Jun. 27, 2017

(86) PCT No.: PCT/CN2017/090330
§ 371 (c)(1),
(2) Date: Dec. 29, 2018

(87) PCT Pub. No.: WO2018/014703
PCT Pub. Date: Jan. 25, 2018

(65) Prior Publication Data
US 2019/0161927 A1    May 30, 2019

(30) Foreign Application Priority Data

Jul. 18, 2016  (CN) .................. 2016 2 0752165 U
Dec. 26, 2016  (CN) .................. 2016 2 1432322 U

(51) Int. Cl.
*E01F 13/00*  (2006.01)
*E01F 13/12*  (2006.01)
*G05D 1/00*  (2006.01)

(52) U.S. Cl.
CPC ............ *E01F 13/12* (2013.01); *G05D 1/0011* (2013.01)

(58) Field of Classification Search
CPC ................................ E01F 13/12; G05D 1/001
(Continued)

(56) References Cited

U.S. PATENT DOCUMENTS 5,549,410 A * 8/1996 Beryozkin ............. E01F 13/12
404/6
5,779,227 A * 7/1998 Elkins ..................... E04H 17/18
256/24

(Continued)

FOREIGN PATENT DOCUMENTS

CN      2853891 Y    1/2007
CN    204000677 U   12/2014
(Continued)

*Primary Examiner* — Raymond W Addie
(74) *Attorney, Agent, or Firm* — Bayramoglu Law Offices LLC

(57) ABSTRACT

A movable car arrester module and a car arrester are disclosed. The movable car arrester module includes an L-shaped support including a base and a vertical column connected to the base. At least one connecting assembly is arranged on the L-shaped support and is used for assembling two adjacent car arrester modules of the same structure into the car arrester. At least one traveling assembly is arranged on the L-shaped support and is mounted on the base. A plurality of car arrester modules are detachably assembled to form the array-type modular car arrester so that the police can intercept and control a vehicle in a short time, and the work efficiency is improved.

17 Claims, 10 Drawing Sheets

(58) Field of Classification Search
USPC .................................................. 404/6
See application file for complete search history.

(56) References Cited

U.S. PATENT DOCUMENTS

| | | | | |
|---|---|---|---|---|
| 6,749,362 | B1 * | 6/2004 | Eichenberg | E01F 13/12 |
| | | | | 404/6 |
| 7,172,176 | B1 * | 2/2007 | Eastland | E01F 13/022 |
| | | | | 256/26 |
| 7,287,929 | B1 * | 10/2007 | Sokolowski | G08B 21/12 |
| | | | | 404/6 |
| 7,481,598 | B2 * | 1/2009 | Jankovsky | B61L 29/04 |
| | | | | 404/6 |
| 7,699,558 | B2 * | 4/2010 | Adler | E01F 13/00 |
| | | | | 404/6 |
| 7,775,738 | B2 * | 8/2010 | Darcy | E01F 13/12 |
| | | | | 256/13.1 |
| 7,850,391 | B2 * | 12/2010 | Omar | E01F 13/12 |
| | | | | 256/13.1 |
| 7,918,622 | B2 * | 4/2011 | Whitford | F41H 11/08 |
| | | | | 256/13.1 |
| 7,959,373 | B1 * | 6/2011 | Brown | E01F 13/048 |
| | | | | 256/13.1 |
| 9,982,403 | B2 * | 5/2018 | Price | E01F 13/12 |
| 10,370,808 | B2 * | 8/2019 | Neusch | E01F 13/12 |
| 10,415,198 | B1 * | 9/2019 | Thomas | E01F 13/02 |
| 2002/0154947 | A1 * | 10/2002 | Farritor | E01F 15/006 |
| | | | | 404/6 |
| 2007/0160420 | A1 * | 7/2007 | Aoki | E01F 15/006 |
| | | | | 404/6 |
| 2010/0290833 | A1 * | 11/2010 | Whitford | F41H 5/14 |
| | | | | 404/6 |
| 2012/0177439 | A1 * | 7/2012 | More | E01F 13/12 |
| | | | | 404/6 |
| 2019/0323187 | A1 * | 10/2019 | Klein | E01F 13/08 |

FOREIGN PATENT DOCUMENTS

| | | |
|---|---|---|
| CN | 105735169 A | 7/2016 |
| CN | 106468049 A | 3/2017 |
| CN | 106996087 A | 8/2017 |
| CZ | 16415 U1 | 5/2006 |
| CZ | 16758 U1 | 9/2006 |
| CZ | 17319 U1 | 3/2007 |
| CZ | 20060837 A3 | 7/2008 |
| GR | 20050100073 A | 10/2006 |

* cited by examiner

MOVABLE CAR ARRESTER MODULE AND CAR ARRESTER

CROSS REFERENCE TO THE RELATED APPLICATIONS

This application is the national phase entry of International Application No. PCT/CN2017/090330, filed on Jun. 27, 2017, which is based upon and claims priority to Chinese Patent Application No. 201620752165.9, filed on Jul. 18, 2016, and Chinese Patent Application No. 201621432322.4, filed on Dec. 26, 2016, the entire contents of which are incorporated herein by reference.

TECHNICAL FIELD

The present invention belongs to the technical field of machines, and relates to a car arrester, in particular to a movable car arrester module and a car arrester.

BACKGROUND

In recent years, the rampant activities of international and national terrorist organizations have led to more and more terrorist events implemented by car collisions and car bombs, which severely endangers world peace and stability. Meanwhile, the police are devoting greater and greater efforts to ban illegal activities such as drunk driving and drugged driving. However, in daily life, the emergencies that certain terrorists, drunk drivers, drugged drivers or other lawbreakers viciously break through the barriers set up by the police to escape happen all the time, which severely threatens the life and property safety of the civil police on duty as well as the masses. In order to forcefully fight against the terrorists and to crack down on illegal and criminal activities, a novel police roadblock is needed to effectively solve the above-mentioned problems to intercept and control terrorist and criminal vehicles.

Thus, it is necessary to design a car arrester which has high environmental adaptability and is able to rapidly reach a specified interception and control location.

SUMMARY

The objective of the present invention is to solve the above-mentioned problems of the prior art by providing a car arrester which has high environmental adaptability and is able to rapidly reach a specified interception and control location.

The objective of the present invention is fulfilled through the following technical scheme: A movable car arrester module comprises an L-shaped support, wherein the L-shaped support comprises a base and an upright column connected with the base, at least one connecting assembly is arranged on the L-shaped support, and two adjacent car arrester modules of the same structure are assembled through the connecting assembly to form a car arrester; and at least one traveling assembly is arranged on the L-shaped support and is mounted on the base, and the car arrester module can move on the ground through the traveling assembly.

According to the movable car arrester module, the traveling assembly comprises at least one set of traveling wheels detachably connected to the base.

According to the movable car arrester module, each traveling wheel is connected with the base through a first connecting piece, wherein the first connecting piece is provided with first long round holes in the vertical direction.

According to the movable car arrester module, the two traveling wheels are separately located on two sides of the base and are located at the front end and the rear end of the base, namely, the two traveling wheels are oppositely distributed front and back.

According to the movable car arrester module, the traveling assembly further comprises at least one set of traction wheels detachably connected to the base and a motor mounted on the L-shaped support and electrically connected with the traction wheels.

According to the movable car arrester module, motors are arranged in the traction wheels.

According to the movable car arrester module, each traction wheel is connected to the base through a second connecting piece, wherein the second connecting piece is provided with second long round holes in the horizontal direction.

According to the movable car arrester module, the two traction wheels are located on the same side of the base or are located on two sides of the base.

According to the movable car arrester module, when the traction wheels are oppositely distributed front and back and the traveling wheels are also oppositely distributed front and back, each traction wheel corresponds to one traveling wheel in position.

According to the movable car arrester module, each car arrester module is provided with one set of traction wheels, or a certain car arrester module is provided with one set of traction wheels.

According to the movable car arrester module, the base and the upright column are detachably or fixedly connected or are integrally formed, wherein when detachably connected, the base and the upright columns can be folded.

According to the movable car arrester module, the base and the upright column are connected through cooperation of a concave part and a convex part and are fixed through a hinge pin.

According to the movable car arrester module, a guide part is arranged at a position, away from the end connected with the upright column, of the base and is used for connecting car arrester modules in the front-back direction.

According to the movable car arrester module, the guide part has a triangular or trapezoidal section, wherein one oblique side of the guide part faces outwards.

According to the movable car arrester module, a reinforcing rib is arranged between the base and the upright column and has two ends detachably connected with the base and the upright column separately.

According to the movable car arrester module, the connecting assembly comprises a first crossbeam part detachably connected to the base and used for connecting two left-right adjacent car arrester modules in the horizontal plane.

According to the movable car arrester module, the first crossbeam part comprises two crossbeams detachably connected to two ends of the base separately, wherein the crossbeam connected to the front end of the base is a front crossbeam, and the crossbeam connected to the rear end of the base is a rear crossbeam.

According to the movable car arrester module, a quadrangular frame is formed in the horizontal plane by assembling two adjacent car arrester modules through the front crossbeam and the rear crossbeam and is used to clamp the tires of a vehicle breaking through a barrier.

According to the movable car arrester module, the front crossbeam and the rear crossbeam are located on the same side of the base or are located on two sides of the base.

According to the movable car arrester module, at least either the L-shaped support or the first crossbeam part or both the L-shaped support and the first crossbeam part are provided with a tire puncture area, wherein one or more sharp objects are evenly arranged in each tire puncture area.

According to the movable car arrester module, the tire puncture area is arranged on the front crossbeam and is installed on an oblique plane.

According to the movable car arrester module, the included angle between each sharp object and the bottom surface is 45°-60°.

According to the movable car arrester module, the sharp objects are hollow tubes or solid tubes, wherein the upper end of each sharp object is a bevel face having an angle of 30°-60°.

According to the movable car arrester module, the car arrester module further comprises a protective cover, wherein the protective cover is arranged on the sharp object in a sleeving manner and is used to protect users against scratches when the users take or move the car arrester module.

According to the movable car arrester module, the protective cover is an independent protective cover or is a row-type protective cover.

According to the movable car arrester module, the connecting assembly further comprises a second crossbeam part detachably connected to the upright column and is used for connecting two left-right adjacent car arrester modules in the vertical plane.

According to the movable car arrester module, a quadrangular frame is formed in the vertical plane by assembling two adjacent car arrester modules through the rear crossbeam and the second crossbeam part, so that the anticollision coefficient of the car arrester is increased.

According to the movable car arrester module, the second crossbeam part and the upright column are connected through cooperation of a concave part and a convex part.

According to the movable car arrester module, a joint between the second crossbeam part and the upright column is located on the same side as a joint between the front crossbeam and the base or is located on the same side as a joint between the rear crossbeam and the base.

According to the movable car arrester module, a tetrahedral structure is formed in space by the second crossbeam part, the front crossbeam and the rear crossbeam after the car arrester module is unfolded.

According to the movable car arrester module, a plurality of buckle parts are arranged on the base, are separately located on two sides of the base and are used for locking the front crossbeam, the rear crossbeam and the second crossbeam part in the non-use state.

According to the movable car arrester module, at least one of the upright column and the rear crossbeam is provided with a reinforcing plate, wherein the reinforcing plate has an end detachably connected to the upright column or the rear crossbeam, is able to rotate around the connecting end and has an end connected to the corresponding main body in a clamped manner when not used.

According to the movable car arrester module, the car arrester module further comprises a plurality of ground hooks arranged at a position where the base and the upright column are connected.

According to the movable car arrester module, the car arrester module further comprises an LED strobe warning lamp mounted on the second crossbeam part.

According to the movable car arrester module, a guide part is arranged at the front end of the base and is able to stretch and retreat in the length direction of the base, wherein a tire puncture area is arranged on one side of an extension section of the guide part.

The present invention further provides a car arrester, which is formed by a plurality of car arrester modules and is of a modular structure.

The car arrester further comprises a controller mounted on the L-shaped support and electrically connected with the motor.

The car arrester further comprises a remote control used to control the car arrester to advance, retreat or steer on the ground.

Compared with the prior art, the present invention has the following beneficial effects:

(1) According to the movable car arrester module, the traveling assembly is mounted on the base so that the car arrester module can be easily moved on the ground; a plurality of car arrester modules are detachably assembled to form the array-type modular car arrester so that the police can intercept and control a vehicle within a short time, and the work efficiency is improved; and in addition, the car arrester module is small in size, low in weight, high in maneuverability and convenient to carry and store.

(2) According to the car arrester provided by the present invention, the number of car arrester modules can be selected according to the width of a road, thus, ensuring convenience and flexibility. In actual application, the car arrester can rapidly intercept a vehicle, is safe, reliable, convenient to use and practical, has positive effects in the enforcement process of the law-enforcing department, and improves the work efficiency of the law-enforcing department.

Reference signs: 100, L-shaped support; 110, base; 111, concave part; 112, guide part; 120, upright column; 121, convex part; 130, reinforcing rib; 140, sharp object; 150, protective cover; 160, buckle part; 170, reinforcing plate; 180, ground hook; 190, LED strobe warning lamp; 200, connecting assembly; 210, first crossbeam part; 211, front crossbeam; 212, rear crossbeam; 220, second crossbeam part; 300, traveling assembly; 310, traveling wheel; 320, first connecting piece; 321, first long round hole; 330, traction wheel; 340, second connecting piece; 341, second long round hole; 400, protective sleeve; 410, step part; 420, triangular part; 500, controller.

DETAILED DESCRIPTION OF THE EMBODIMENTS

The technical solution of the present invention is further described below with reference to specific embodiments and accompanying drawings. However, the present invention is not limited to these embodiments.

Figure 1:
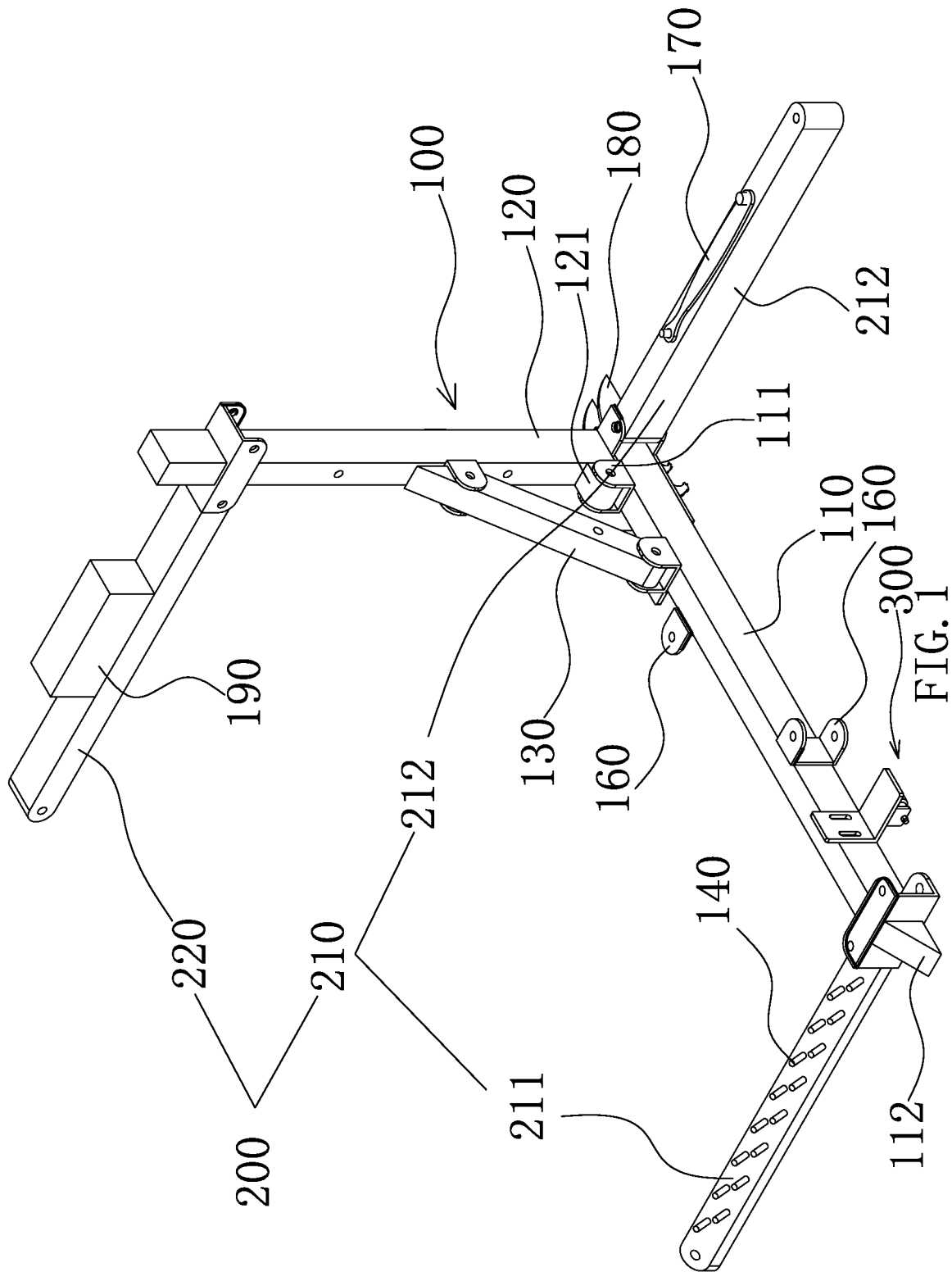
FIG. 1 is a structural view of a movable car arrester module in the working state of the present invention.
Figure 2:
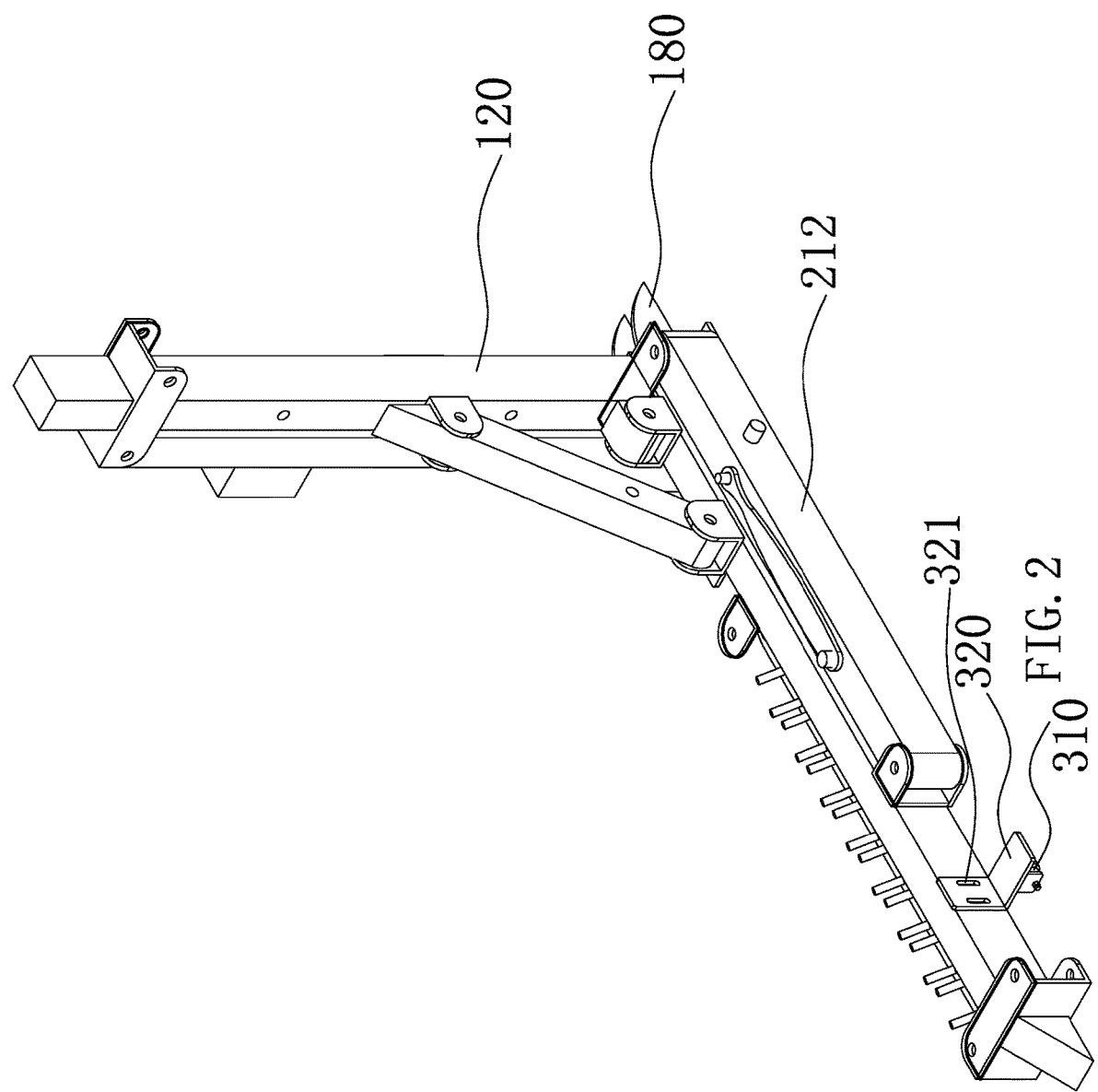
FIG. 2 is a structural view of the movable car arrester module in the non-working state of the present invention.

As shown in FIG. 1 and FIG. 2, the present invention provides a movable car arrester module. The movable car arrester module comprises an L-shaped support 100. The L-shaped support 100 comprises a base 110 and an upright column 120 connected with the base 110, wherein the base 110 and the upright column 120 are detachably or fixedly connected. When detachably connected, the base 110 and the upright column 120 are fixed with a screw or a hinge pin. When fixedly connected, the base 110 and the upright column 120 are welded together or are integrally formed (the base 110 and the upright column 120 are integrally formed in a right-angled L shape). At least one connecting assembly 200 is arranged on the L-shaped support 100. Two adjacent car arrester modules of the same structure are assembled through the connecting assembly 200 to form a car arrester, and car arrester is of an array type, wherein the number of car arrester modules to be assembled into the car arrester depends on the width of a road, thus, ensuring flexibility and convenience. At least one traveling assembly 300 is arranged on the L-shaped support 100 and is mounted on the base 110. The car arrester module can move on the ground through the traveling assembly 300 and does not need to be manually transferred.

According to the movable car arrester module provided by the present invention, the traveling assembly 300 is mounted on the base 110 so that the car arrester module can be moved on the ground effortlessly; a plurality of car arrester modules are detachably assembled to form the array-type modular car arrester so that the police can intercept and control a vehicle in a short time, and the work efficiency is improved; and in addition, the car arrester module is small in size, low in weight, high in maneuverability and convenient to carry and store.

Preferably, as shown in FIG. 1 and FIG. 2, the traveling assembly 300 comprises at least one set of traveling wheels 310 (the number of the traveling wheels 310 is two), wherein the traveling wheels 310 are detachably connected to the base 110, are separately located at two ends of the base 110 and are arranged in the length direction of the base 110. Preferably, the traveling wheels 310 are universal wheels so that the car arrester module can steer freely or can bypass a barrier to smoothly reach a specified location to intercept and control a vehicle. Preferably, each traveling wheel 310 is connected to the base 110 through a first connecting piece 320, wherein the first connecting piece 320 is detachably connected with the base 110. Preferably, first long round holes 321 are formed in an end, connected with the base 110, of each first connecting piece 320 in the vertical direction so that the ground clearance of the base 110 can be adjusted to enable the car arrester module to adapt to different roads, and the flexibility the car arrester module is improved.

Preferably, the two traveling wheels 310 are separately located on two sides of the base 110, are arranged at the front end and rear end of the base 110 and are connected to the base 110 through the first connecting pieces 320, and through the front-back opposite distribution form of the traveling wheels, the left side and the right side of the car arrester module are balanced, the car arrester module is protected against rollover in the moving process, and the stability of the car arrester module is improved.

Figure 3:
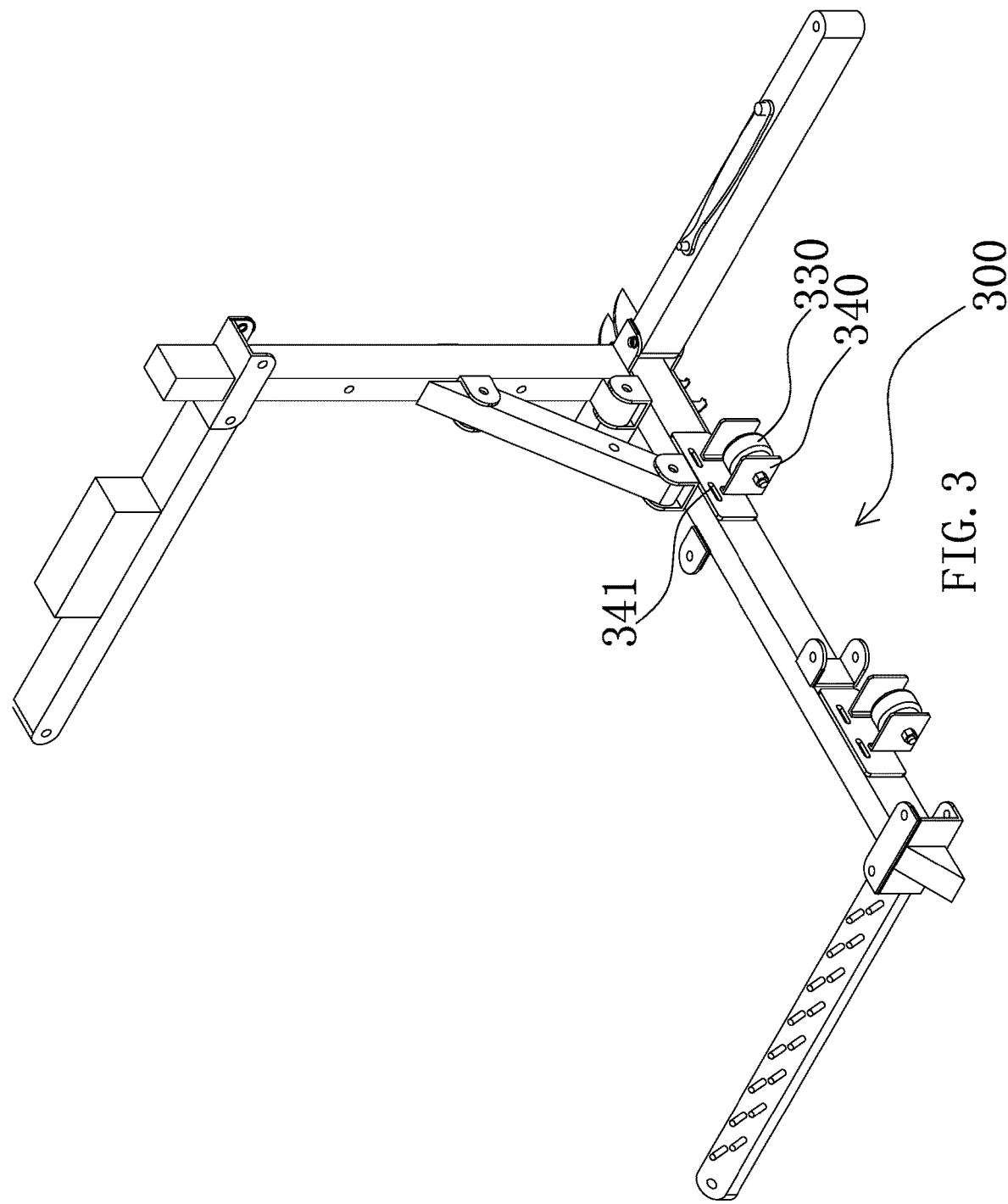
FIG. 3 is a structural view of the car arrester module in the working state in another embodiment of the present invention.

Preferably, as shown in FIG. 1, FIG. 2 and FIG. 3, the traveling assembly 300 further comprises at least one set of traction wheels 330 (the number of the traction wheels 330 is two) and a motor (not shown), wherein the traction wheels 330 are detachably connected to the base 110, are separately located at two ends of the base 110 and are arranged in the length direction of the base 110; and the motor is mounted on the L-shaped support 110 and is electrically connected with the traction wheels 330 to drive the traction wheels 330 to rotate, then the traveling wheels 310 are driven to rotate on the ground, and finally, the car arrester module moves on the ground. Preferably, motors are arranged in the traction wheels 330, so that the size of the car arrester module is reduced, and the car arrester module has a more compact structure. Circuits for electrical connection between the motors and the traction wheels 330 are arranged in the traction wheels 330 without being exposed, so that the reliability of the car arrester module is improved. Preferably, each traction wheel 330 is connected to the base 110 through a second connecting piece 340, wherein second long round holes 341 are formed in the second connecting piece 340 in the horizontal direction and are used for adjusting the relative distance between the two traction wheels 330, so that the car arrester module is kept stable in the traveling process and is protected against rollover. Preferably, the two traction wheels 330 are located on the same side of the base 110 or are located on two sides of the base 110. When the two traction wheels 330 are separately located on two sides of the base 110, the traction wheels 330 are separately distributed at the front end and the rear end of the base 110 like the travelling wheels. Furthermore, when the traction wheels 330 are separately distributed at the front end and the rear end of the base 110 and the traveling wheels 310 are also separately distributed at the front end and the rear end of the base 110, each traction wheel 330 corresponds to one traveling wheel 310 in position, which means that traction wheels 330 are separately located on two sides of the base 110 and the traveling wheels 310 are also separately located on two sides of the base 110, so that the car arrester module is kept stable in the traveling process. Preferably, each car arrester module is provided with one set of traction wheels 330, or a certain car arrester module is provided with one set of traction wheels 330.

Preferably, as shown in FIG. 1 and FIG. 2, to facilitate subsequent description, the base 110 is detachably connected with the upright column 120 through a hinge pin in this embodiment so that the L-shaped support 100 can be folded, and the size of the car arrester module is further reduced. Preferably, the base 110 and the upright column 120 are connected through cooperation of a concave part 111 and a convex part 121, wherein the concave part 111 is arranged on the base 110, and the convex part 121 is arranged on the upright column 120; or the convex part 121 is arranged on the base 110, and the concave part 111 is arranged on the upright column 120 these two connection methods both can fulfill connection between the base 110 the upright column 120; in order to facilitate subsequent description, the first connection method is adopted in this embodiment, namely, the concave part 111 is arranged on the base 110, the convex part 121 matched with the concave part 111 is arranged on the upright column 120, the base 110 is embedded in the upright column 120, and the base 110 and the upright column 120 are connected through a hinge pin penetrating through the concave part 111 on the base 110 and the convex part 121 on the upright column 120; and the base 110 can rotate through the hinge pin, so that the included angle between the base 110 and the upright column 120 is changed. Through the cooperation between the concave part 111 and the convex part 121 and the fixation of the hinge pin, the degree of horizontal freedom of the upright column in the plane where the base 110 is located is limited, and the base 110 and the upright column 120 are connected more firmly.

Preferably, as shown in FIG. 1 and FIG. 2, a guide part 112 is arranged at a position, away from the end connected with the upright column 120, of the base 110 and is used for connecting car arrester modules in the front-back direction. Two adjacent parallel car arrester modules are connected in the left-right direction through the connecting assembly 200 and are connected in the front-back direction through the guide part 112 to form an array-type or matrix-type car arrester, the vehicle interception capacity of the car arrester is improved, and different vehicles can be intercepted by the car arrester. Preferably, the guide part 112 has a triangular or trapezoidal section, wherein one oblique side of the guide part 112 having a triangular or trapezoidal section faces outwards (in the same direction as the right-angled concave face formed by the base 110 and the upright column 120) to facilitate connection of two adjacent parallel car arrester modules in the front-back direction.

Preferably, as shown in FIG. 1 and FIG. 2, a reinforcing rib 130 is arranged between the base 110 and the upright column 120 and has two ends detachably connected with the base 110 and the upright column 120 separately, so that the overall strength and rigidity of the car arrester module are improved. Preferably, the reinforcing rib 130 can rotate around the connecting ends (the end, connected with the base 110, of the reinforcing rib 130 and the end, connected with the upright column 120, of the reinforcing rib 130), so that when not used, the car arrester module can be folded to reduce the size. Or, the reinforcing rib 130 can rotate around only one connecting end, and the other end of the reinforcing rib 130 abuts against the base 110 or the upright column 120 connected with this end, so that the strength of the car arrester module in use is further improved. In this embodiment, the reinforcing rib 130 can rotate around the end connected with the base 110, and the end, connected with the upright column 120, of the reinforcing rib 130 abuts against the upright column 120.

Preferably, as shown in FIG. 1 and FIG. 2, the connecting assembly 200 comprises a first crossbeam part 210 detachably connected to the base 110, and the first crossbeam part 210 is used for connecting two left-right adjacent arrester modules adjacent in the horizontal plane. Preferably, the first crossbeam part 210 comprises two crossbeams, the two crossbeams are the front crossbeam 211 and the rear crossbeam 212, the front crossbeam 211 and the rear crossbeam 212 detachably connected to two ends of the base 110 separately, wherein the front crossbeam 211 connects to the front end of the base 100 (the end away from the upright column 120), the rear crossbeam 212 connects to the rear end of the base 110 (the end close to the upright column 120), and the front crossbeam 211 and the rear crossbeam 212 are separately used as a front connecting part and a rear connecting part of the car arrester module. When two left-right adjacent car arrester modules are connected, a quadrangular frame is formed by the two assembled car arrester modules in the horizontal plane. If an intercepted vehicle intends to break through the barrier to escape, the quadrangular frame will be impacted by the vehicle when the front wheels of the vehicle dash into the quadrangular frame, and then the quadrangular frame deforms and tilts to clamp the front wheels of the vehicle, so that the vehicle cannot move anymore and is effectively prevented from escaping, and the enforcement efficiency and safety are effectively improved for the police.

Preferably, as shown in FIG. 1 and FIG. 2, the front crossbeam 211 and the rear crossbeam 212 are located on the same side of the base 110 or are located on two sides of the base 110. When the front crossbeam 211 and the rear crossbeam 212 are located on the same side of the base 110, a small quadrangular frame is formed by the two left-right adjacent car arrester modules. When the front crossbeam 211 and the rear crossbeam 212 are located on two sides of the base 110, a large quadrangular frame is formed by the two left-right adjacent car arrester modules. These two configurations are suitable for interception and control on roads with different widths, and the flexibility of the car arrester is improved. To facilitate subsequent description, the second connection method is adopted in this embodiment, namely the front crossbeam 211 and the rear crossbeam 212 are separately located on two sides of the base 110. Preferably, the front crossbeam 211, the rear crossbeam 212 and the base 110 are connected in the same way as the base 110 and the upright column 120, namely, the base 110, the front crossbeam 211 and the rear crossbeam 212 are connected and fixed through cooperation between concave parts 111 and convex parts 121 by means of hinge pins penetrating through the concave parts 111 on the base 110 and the convex parts 121 on the front crossbeam 211 and the rear crossbeam 212. In this embodiment, the concave parts 111 are arranged on the base 110, and the convex parts 121 are arranged on the front crossbeam 211 and the rear crossbeam 212. Preferably, the front crossbeam 211 and the convex part 121 on the front crossbeam 211 are integrally formed, the rear crossbeam 121 and the convex part 121 on the rear crossbeam 212 are integrally formed, and the included angle between the front crossbeam 211 and the base 110 and the included angle between the rear crossbeam 212 and the base 110 can be adjusted through the hinge pins.

Preferably, as shown in FIG. 1 and FIG. 2, either the L-shaped support 100 or the first crossbeam part 210 or both the L-shaped support 100 and the first crossbeam part 210 are provided with a tire puncture area, wherein at least one or a plurality of sharp objects 140 are evenly arranged in the tire puncture area. When a vehicle hits against the car arrester module, the tires of the vehicle are punctured by the sharp objects 140 in the tire puncture area and then are deflated in a short time (tests show that the tires can be completely deflated within 30 s), so that the vehicle is prevented from moving forwards, the work efficiency of the police is improved, and the personal safety of the police is ensured. Preferably, the sharp objects 140 can be tooth-shaped, blade-shaped or spike-shaped. In this embodiment, columnar spike-shaped sharp objects 140 are adopted (tire puncture spikes).

Furthermore, as shown in FIG. 1 and FIG. 2, the tire puncture area is arranged on the front crossbeam 211 to make contact with the tires of an intercepted vehicle at the first time, and the sharp objects 140 can penetrate into the tires of the vehicle at the first time to intercept of the vehicle rapidly.

Furthermore, as shown in FIG. 1 and FIG. 2, the tire puncture area is installed on an oblique plane, so that sharp parts of the sharp objects 140 installed on the front crossbeam 211 right face the tires of an oncoming vehicle and can fully and effectively penetrate into the tires of the vehicle, and accordingly, the deflation time of the tires of the vehicle is further shortened, and the safety of the police in work is improved. Preferably, the included angle between the tire puncture spikes and the bottom surface is 45°-60°.

Preferably, as shown in FIG. 1 and FIG. 2, the tire puncture spikes are hollow tubes or solid tubes. In this embodiment, the tire puncture spikes are hollow tubes, and the upper ends of the hollow tubes are bevel faces having an angle of 35°-60°.

Figure 4:
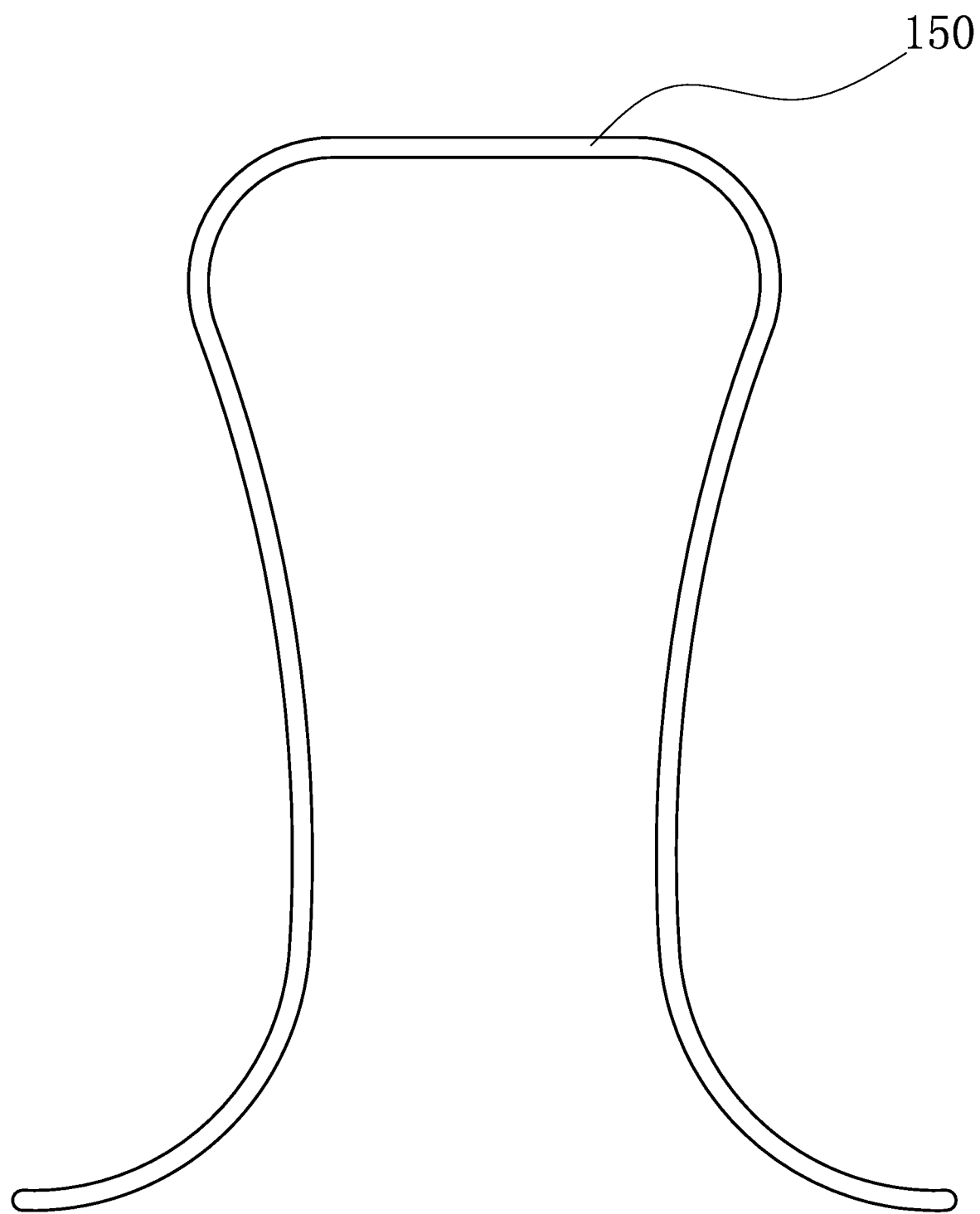
FIG. 4 is a structural view of a protective cover in a preferred embodiment of the present invention.
Figure 5:
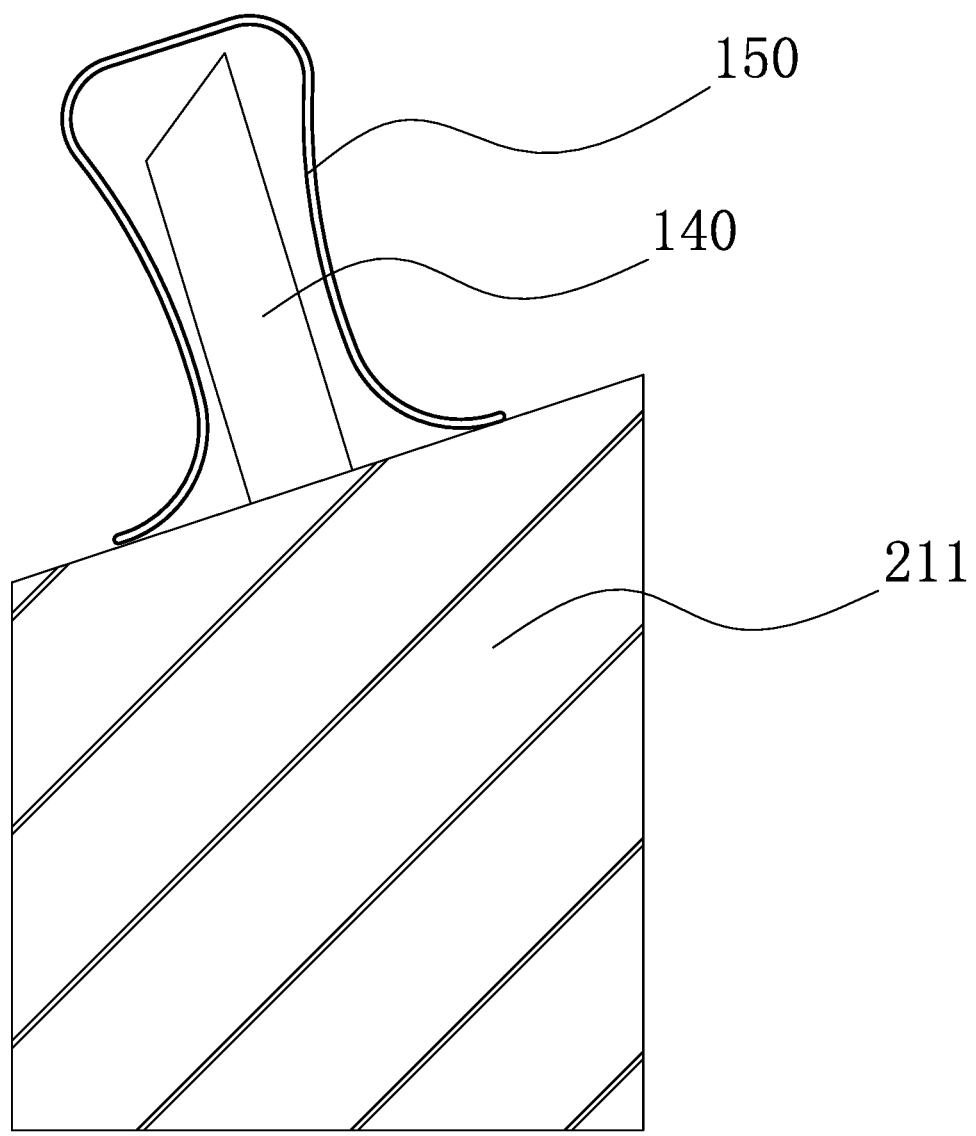
FIG. 5 is a structural view of the protective cover in the closed state in the preferred embodiment of the present invention.
Figure 6:
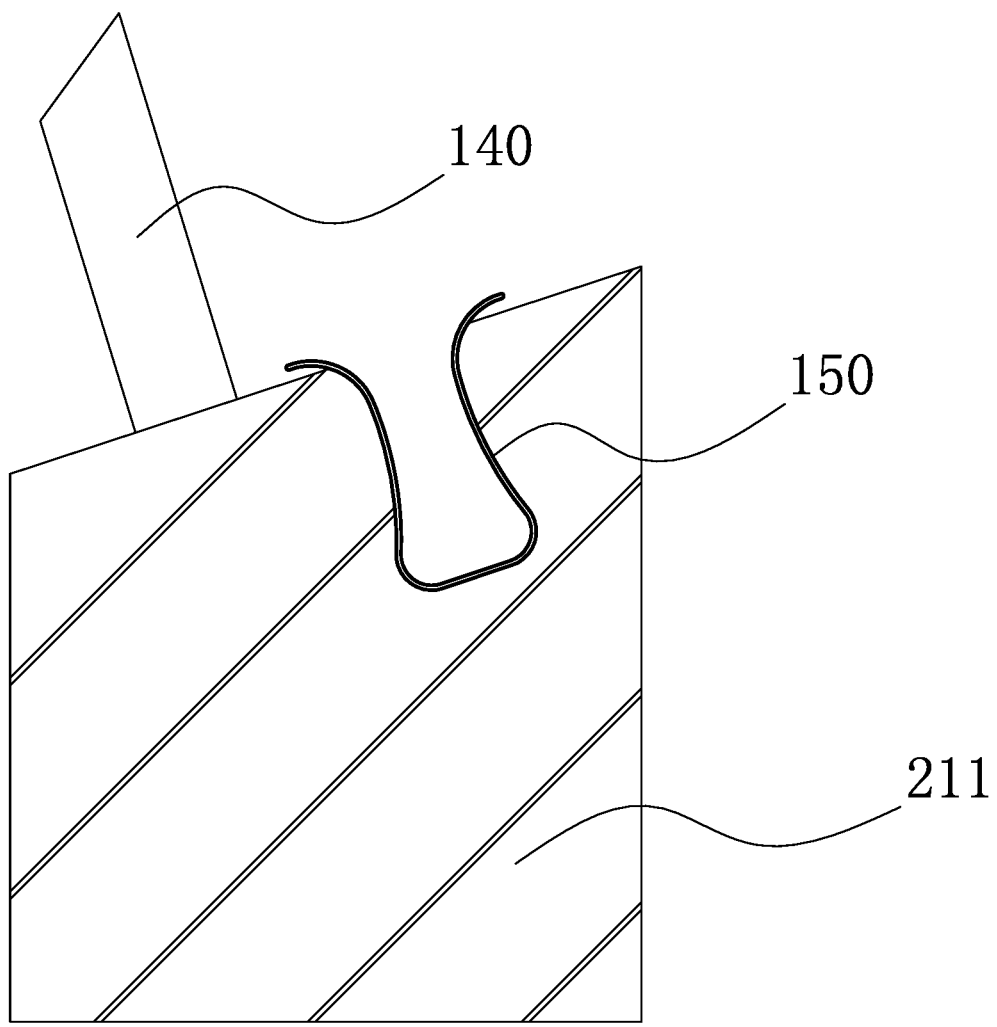
FIG. 6 is a structural view of the protective cover in the open state in the preferred embodiment of the present invention.

Preferably, as shown in FIG. 4, FIG. 5 and FIG. 6, the car arrester module further comprises a protective cover 150 arranged on the sharp object 140 in a sleeving manner and used to protect users against scratches when the user takes or moves the car arrester module, so that the safety of the car arrester module is improved. The protective cover 150 can be an independent one as shown in FIG. 4, which means that each sharp object 140 corresponds to one protective cover 150. Or, a row-type protective cover 150 (formed by a plurality of independent protective covers 150 or integrally formed by a mold) is adopted, which means that one protective cover 150 corresponds to a row of sharp objects 140, so that the protective cover 150 can be rapidly taken down from the sharp objects 140 in use, and accordingly, the police can rapidly complete deployment and control. Preferably, the protective cover 150 is made from rubber or plastic, wherein an independent protective cover 150 is shaped like, and all arc sections are in circular arc transition, so that the surface of the protective cover 150 is smooth, the safety of the protective cover 150 is improved, and the service life of the protective cover 150 is prolonged. Preferably, the row-type protective cover 150 can be detachably connected to the front crossbeam 211 directly; when the car arrester module is used, the row-type protective cover 150 is turned open to expose the sharp objects 140 in the protective cover 150, and then the tires of a vehicle intending to escape are punctured by the sharp objects 140; and when the car arrester module is not used, the row-type protective cover 150 is turned closed to cover the sharp objects 140, so that users are protected from being injured by the sharp objects 140 when taking the car arrester module. Preferably, a plurality of slots are formed in positions, corresponding to the row-type protective cover, of the front crossbeam 211, and the ends of the protective cover 150 (the blunt ends of the independent protective covers 150) are embedded in the slots when the row-type protective cover 150 is turned open, so that the row-type protective cover 150 is prevented from being closed when the sharp objects 140 are used, and the reliability of the car arrester module is improved.

Preferably, as shown in FIG. 1 and FIG. 2, a plurality of buckle parts 160 are arranged on the base 110 and are separately located on two sides of the base 110 and on the upright column 120. When the car arrester module is not used, the front crossbeam 211 and the rear crossbeam 212 are folded to the two sides of the base 110 and are locked through the buckle parts 160, so that the front crossbeam 211 and the rear crossbeam 212 are prevented from being automatically unfolded when the car arrest module is not used, which may otherwise cause damage to the car arrester module. Preferably, the buckle parts 160 are in a U shape, and the front crossbeam 211 and the rear crossbeam 212 are embedded in the buckle parts 160 in a matched manner and are fixedly connected with the buckle parts 160 through screws.

Preferably, as shown in FIG. 1 and FIG. 2, the connecting assembly 200 further comprises a second crossbeam part 220 detachably connected to the upright column 120 and is used for connecting two left-right adjacent car arrester modules in the vertical plane, so that another quadrangular frame is formed by the two adjacent car arrester modules in the vertical plane and is matched with the quadrangular frame in the horizontal plane to form a latticed car arrester which can intercept a vehicle more efficiently and has higher strength. Preferably, the second crossbeam part 220 is connected with the upright column 120 through cooperation between a concave part 111 and a convex part 121, and the connection method and connection structure of the second crossbeam part 220 and the upright column 120 are the same as those of the first crossbeam part 210 and the base 110. In this embodiment, the concave part 111 is arranged on the upright column 120, the convex part 121 is arranged on the second crossbeam part 220, and the convex part 121 and the second crossbeam part 220 are integrally formed. Preferably, the rear crossbeam 212 and the second crossbeam part 220 have the same size and are made from the same material, so that the rear crossbeam 212 and the second crossbeam part 220 are interchangeable, the number of part types of the car arrester module is reduced, and assembly and management of the car arrester module are facilitated. Preferably, the joint between the second crossbeam part 220 and the upright column 120 is located on the same side as the joint of the front crossbeam 211 and the base 110 or is located on the same side as the joint of the rear crossbeam 212 and the base 110.

Preferably, as shown in FIG. 1 and FIG. 2, after the car arrester module is unfolded, a tetrahedral structure is formed by the second crossbeam part 220, the front crossbeam part 211 and the rear crossbeam 212 in space, which means that any two of the four components are located on a different plane from the other two components. In this way, the car arrester module is more stable in structure after being unfolded, and a car arrester formed a plurality of the car arrester modules of such structure is also more stable in structure and higher in strength.

Preferably, as shown in FIG. 1 and FIG. 2, the upright column 120 and the rear crossbeam 212 are provided with at least one a reinforcing plate 170, the reinforcing plate 170 has an end detachably connected with the upright column 120 or the rear crossbeam 212 and is able to rotate around the connecting end (the end, connected with the upright column 120, of the reinforcing plate 170, or the end, connected with the rear crossbeam 212, of the reinforcing plate 170), and the other end of the reinforcing plate 170 is connected to the corresponding main body in a clamped manner (if the connecting plate is connected to the upright column 120, the main body is the upright column 120; if the connecting plate is connected to the rear crossbeam 212, the main body is the rear crossbeam 212). When the car arrester module is used, the front crossbeam 211, the rear crossbeam 212 and the second crossbeam part 220 are unfolded; the reinforcing plate 170 connected to the upright column 120 is rotated around the connecting end, and the other end of the reinforcing plate 170 connected to the upright column 120 is connected to the rear crossbeam 212 in a buckled manner; the reinforcing plate 170 connected to the rear crossbeam 212 is rotated around the connecting end, and the other end of the reinforcing plate 170 connected to the rear crossbeam 212 is connected to the base 110 in a clamped manner, so that a triangular structure is formed in space by the two reinforcing plates 170 and the reinforcing rib 130, and the stability of strength of the car arrester module are improved.

Preferably, as shown in FIG. 1 and FIG. 2, the car arrester module further comprises a plurality of ground hooks 180 arranged at the position where the base 110 and the upright column 120 are connected, wherein part of the ground hooks 180 are used for fixing the car arrester module on the ground, and the other part of the ground hooks 180 are used for firmly fixing the car arrester at the original position when the car arrester is impacted by a vehicle in work, and thus, the vehicle is effectively prevented from moving forwards.

Figure 7:
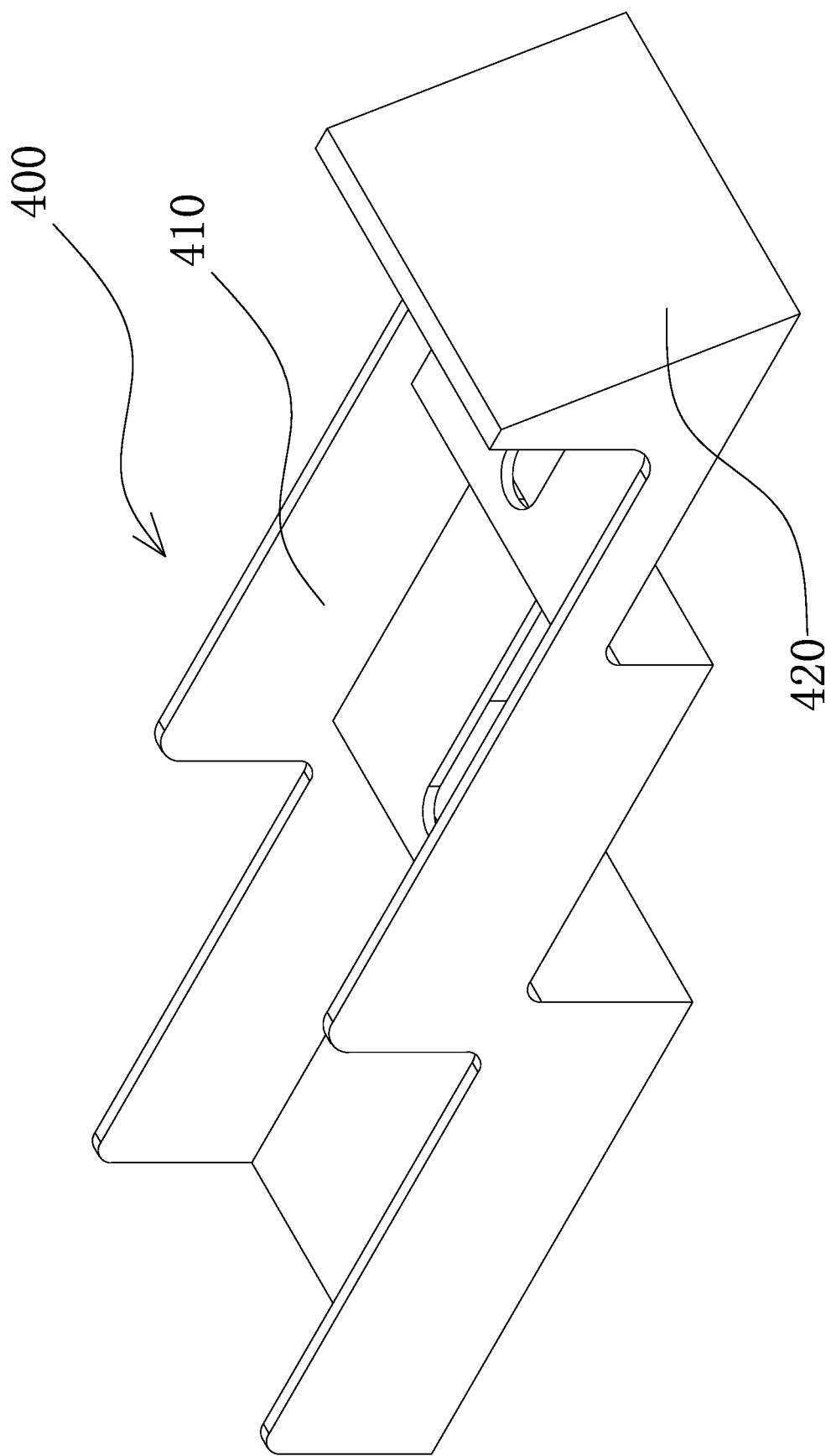
FIG. 7 is a structural view of a protective sleeve in a preferred embodiment of the present invention.

Preferably, as shown in FIG. 1, FIG. 2 and FIG. 7, the car arrester module further comprises a protective sleeve 400 arranged outside the ground hooks 180 and used to reduce the friction force between the ground hooks 180 and the ground and to increase the sliding distance of the car arrester module relative to the ground when the car arrester module intercepts a vehicle breaking through the barrier. When the car arrester module is arranged on a cement ground, the protective sleeve 400 is not arranged outside the ground hooks 180. When the car arrester module is arranged on an asphalt ground having a friction coefficient higher than that of the cement ground, the protective sleeve 400 is arranged outside the ground hooks 180 to decrease the friction coefficient between the ground hooks 180 and the asphalt ground and to increase the sliding distance of the car arrester module, so that the impact force applied to the car arrester module when the car arrester module is impacted by a vehicle is reduced, damage to the car arrester module is reduced, and the service life of the car arrester module is prolonged.

Preferably, as shown in FIG. 1, FIG. 2 and FIG. 7, the protective sleeve 400 is in a step shape and is matched with the ground hooks 180 in position, so that the ground hooks 180 are completely wrapped in the protective sleeve 400 and are prevented from making contact with the ground, and the ground hooks 180 are completely wrapped and protected by the protective sleeve 400 more reliably. Preferably, the ground hooks 180 are distributed horizontally or vertically, wherein a step part 410 is the protective sleeve 400 is buckled to the outer side of the vertical ground hook 180, and a triangular part of the protective sleeve 400 is buckled to the outer side of the horizontal hook ground 180, so that the protective sleeve 400 is not prone to falling when arranged outside of the ground hooks 180, and the reliability of the protective sleeve 400 is improved.

Preferably, as shown in FIG. 1 and FIG. 2, the car arrester module further comprises an LED strobe warning lamp 190 mounted on the second crossbeam part 220 and used to remind an oncoming vehicle to slow down, wherein the LED strobe warning lamp 190 strobes rapidly or slowly or emits white light for illumination. Preferably, the second crossbeam part 220 is red and white so as to reflect light when irradiated by the lamplight of the oncoming vehicle in use at night, and thus, the oncoming vehicle is further reminded to slow down.

Figure 8:
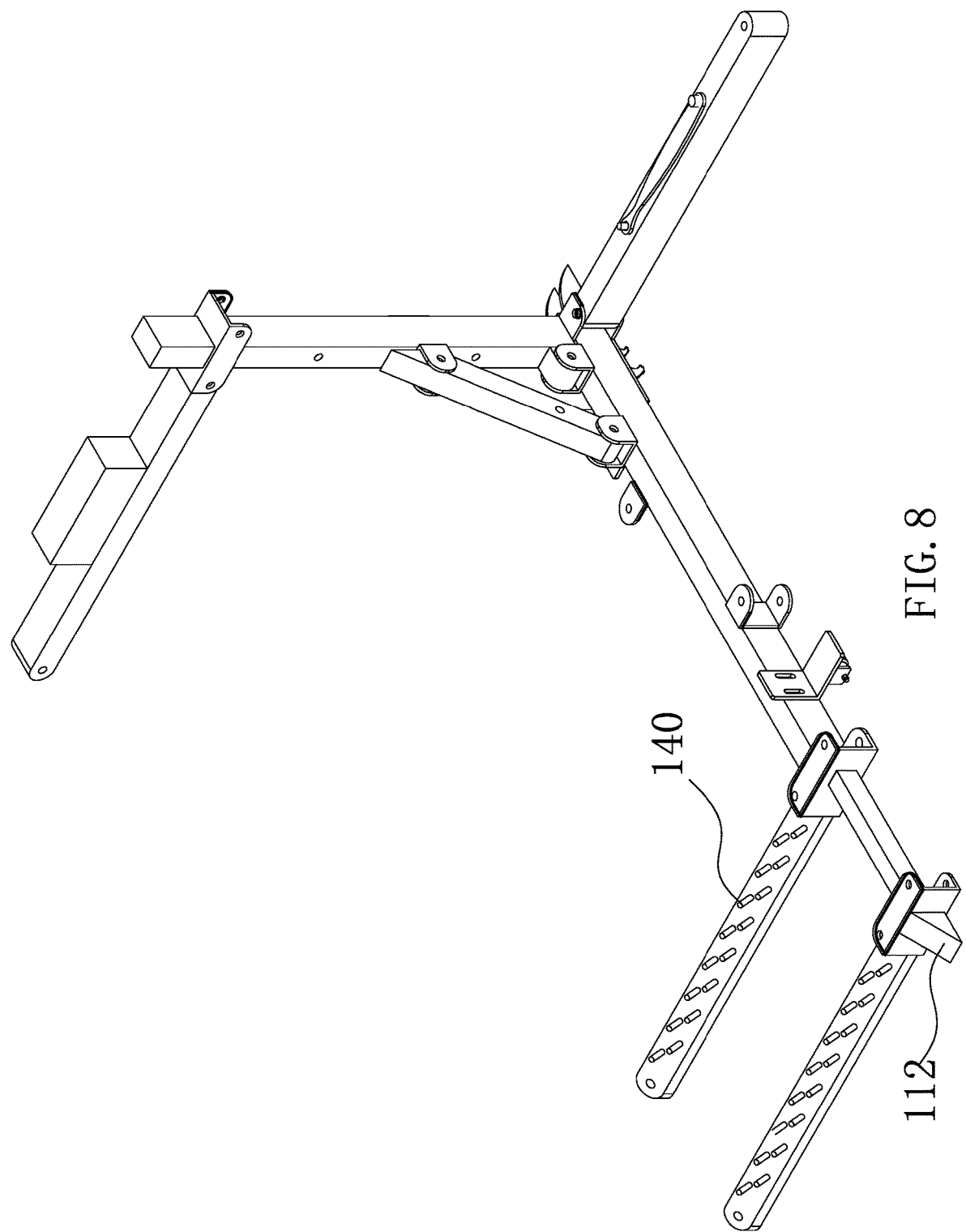
FIG. 8 is a structural view of the car arrester module in the working state in a third embodiment of the present invention.

Preferably, as shown in FIG. 1 and FIG. 2, an anti-theft screw is arranged on the L-shaped support 100, so that the car arrester module can be stored for a long time without getting lost Preferably, as shown in FIG. 1, FIG. 2 and FIG. 8, the guide part 112 located at the front end of the base 110 (the end where the front crossbeam 211 is located) can stretch and retreat in the length direction of the base 110, wherein a tire puncture area is arranged on one side of an extension section of the guide part 112. When the car arrester module is used to intercept a small vehicle, the guide part 112 does not need to be pulled out, and only the tire puncture area on the front crossbeam 211 is used. When the car arrester module is used to intercept a medium or large vehicle, the guide part 112 is pulled out in the length direction of the base 110 to increase the tire puncture rate of the medium or large vehicle under the dual effect of the tire puncture area on the extension section of the guide part 112 and the tire puncture area on the front crossbeam 211, and thus, the vehicle can be intercepted more effectively. Preferably, the tire puncture area on one side of the extension section of the guide part 112 and the tire puncture area on the front crossbeam 211 are of the same structure.

Figure 9:
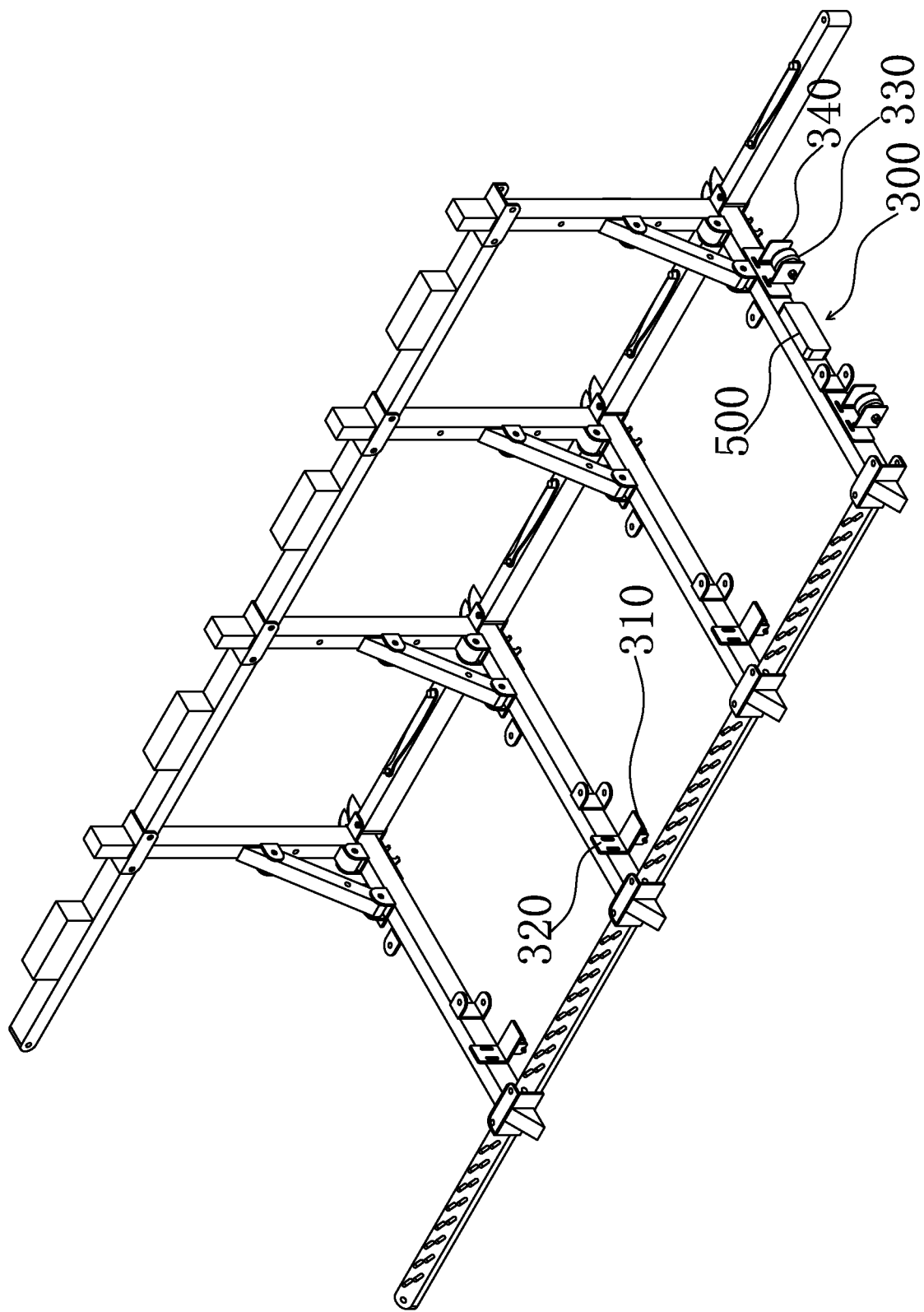
FIG. 9 is a structural view of a car arrester in the working state of the present invention.

The invention further provides a car arrester. As shown in FIG. 9, the car arrester comprises a plurality of car arrester modules and is of a modular structure, the number of the car arrester modules to be assembled into the car arrester can be selected according to the width of a road, thus, ensuring flexibility and convenience. In actual application, the car arrester can be fully used to control a vehicle rapidly, is safe, reliable, convenient to use and practical, has a positive effect in the enforcement process of the law-enforcing department and improves the work efficiency of the law-enforcing department.

Preferably, as shown in FIG. 1, FIG. 2, FIG. 3 and FIG. 8, the car arrester further comprises a controller 500 mounted on the L-shaped support 100 and electrically connected with the motor. The motor is driven by the controller 500 to rotate, then the traction wheels 330 are driven to rotate, and finally, the car arrester is driven to move on the ground. Preferably, the car arrester further comprises a remote control (not shown) used to control the car arrester to advance, retreat or steer on the ground so that the car arrester can rapidly reach a specified location to intercept and control a vehicle, and the work efficiency of the police is improved.

The working principle of the car arrester provided by the present invention is as follows: the car arrester is controlled by the remote control to reach a specific location for interception and control; when an oncoming vehicle impacts the L-shaped support 100 of the car arrester after the tires of the vehicle run over the tire puncture spikes, the upright column 120 of the car arrester is stressed to incline backwards to pull the base 110 upwards, so that the impact force of the vehicle is converted into a supporting force to support the chassis of the vehicle, then the front wheels of the vehicle are lifted away from the ground, and the vehicle cannot move forwards anymore; after the car arrester is impacted by the vehicle, the front side of the car arrester is convex, the quadrangular frame of the car arrester in the horizontal plane is rhombic and clamps the tires of the vehicle, the vehicle and the car arrester are integrated, the front-wheel drive of the vehicle is effectively controlled, and rollover of the vehicle is prevented.

Figure 10:
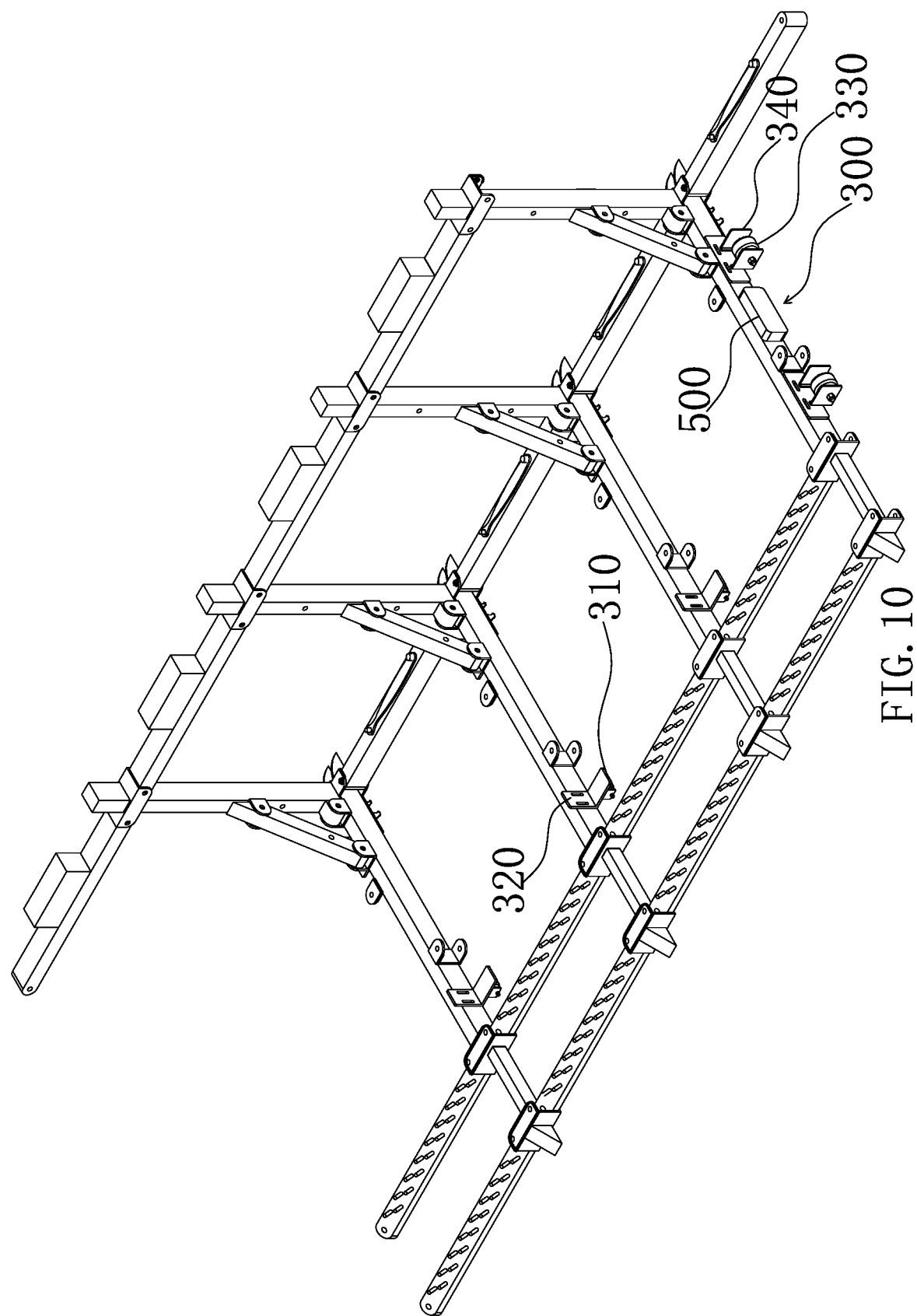
FIG. 10 is a structural view of the car arrester formed by assembling the car arrester modules shown in FIG. 8 in the working state.

The present invention further provides a car arrester. As shown in FIG. 10, the car arrester is formed by a plurality of car arrester modules and is provided with two parallel tire puncture areas. Such car arrester can puncture the tires of a medium or large vehicle intercepted, and the tires of a vehicle breaking through the barrier can be punctured more reliably.

The specific embodiments described above are only illustrative ones for explaining the spirit of the present invention. Those skilled in the field can achieve various modifications or supplements or similar substitutes of the specific embodiments without deviating from the spirit of present invention or going beyond the scope defined by the claims.

What is claimed is:

1. A movable car arrester module, comprising:
at least two L-shaped supports, wherein each L-shaped support of the at least two L-shaped supports comprises a base and an upright column connected to the base;
at least one connecting assembly is arranged on the each L-shaped support;
at least one traveling assembly is arranged on the each L-shaped support and is mounted on the base, and the movable car arrester module moves on a ground through the traveling assembly;
wherein two adjacent L-shaped supports with same structure of the at least two L-shaped supports are connected through the connecting assembly to form the movable car arrester module;
a guide part is arranged at a position on the base, the position is away from an end of the base, the end of the base is connected to the upright column, and the guide part is configured for connecting the movable car arrester modules in a front-back direction;
the guide part stretches and retreats in a length direction of the base, and a tire puncture area is arranged on one side of an extension section of the guide part.

2. The movable car arrester module according to claim 1, wherein
the base and the upright column are detachably or fixedly connected to each other, or the base and the upright column are integrally formed, and the base and the upright column are foldable when the base is detachably connected to the upright column.

3. The movable car arrester module according to claim 1, wherein the base and the upright column are connected through a cooperation of a concave part with a convex part, and the base and the upright column are fixed through a hinge pin.

4. The movable car arrester module according to claim 1, wherein the moveable car arrester module further comprises a plurality of ground hooks arranged at a position, and the base and the upright column are connected at the position.

5. The movable car arrester module according to claim 4, wherein the moveable car arrester module further comprises a protective sleeve arranged outside each ground hook of the plurality of ground hooks in a sleeving manner, and the protective sleeve is configured to reduce a friction force between the each ground hook and a bottom surface.

6. The movable car arrester module according to claim 1, wherein the traveling assembly comprises at least one set of traveling wheels detachably connected to the base.

7. The movable car arrester module according to claim 6, wherein the traveling assembly further comprises at least one set of traction wheels detachably connected to the base, and a motor electrically connected to the set of traction wheels.

8. The movable car arrester module according to claim 7, wherein the each L-shaped support is provided with one set of the at least one set of traction wheels, or one of the at least two L-shaped supports is provided with one set of the at least one set of traction wheels.

9. The movable car arrester module according to claim 1, wherein the connecting assembly comprises a first crossbeam part detachably connected to the base, and the first crossbeam part is configured for connecting the two adjacent L-shaped supports in a horizontal plane.

10. The movable car arrester module according to claim 9, wherein the first crossbeam part comprises a plurality of crossbeams, each crossbeam of the plurality of crossbeams is detachably connected to two ends of the base, the each crossbeam connected to a front end of the base is a front crossbeam, and the each crossbeam connected to a rear end of the base is a rear crossbeam.

11. The movable car arrester module according to claim 10, wherein a quadrangular frame is formed in the horizontal plane by assembling the two adjacent L-shaped supports through the front crossbeam and the rear crossbeam, and the quadrangular frame is configured for clamping tires of a vehicle breaking through a barrier.

12. The movable car arrester module according to claim 10, wherein the connecting assembly further comprises a second crossbeam part detachably connected to the upright column, and the second crossbeam part is configured for connecting the two adjacent L-shaped supports in a vertical plane.

13. The movable car arrester module according to claim 12, wherein a quadrangular frame is formed in the vertical plane by assembling the two adjacent L-shaped supports through the rear crossbeam and the second crossbeam part, so that an anti-collision coefficient of the car arrester is increased.

14. The movable car arrester module according to claim 10, wherein at least one of the upright column and the rear crossbeam is provided with a reinforcing plate, and the reinforcing plate comprises a first end and a second end, the first end is detachably connected to the upright column or the rear crossbeam, the reinforcing plate rotates around a connecting end, and the second end is connected to a corresponding main body in a clamped manner when the reinforcing plate is not used.

15. The movable car arrester module according to claim 9, wherein at least one of the at least two L-shaped supports and the first crossbeam part is provided with a tire puncture area, at least one sharp object is evenly arranged in the tire puncture area.

16. A car arrester, comprising: a plurality of the moveable car arrester modules according to claim 1, wherein the car arrester modules are assembled through the connecting assemblies to form the modular car arrester.

17. The car arrester according to claim 16, wherein the car arrester further comprises a controller, the controller is mounted on the each L-shaped support and eclectically connected to a motor and a remote control, and the remote control is configured to control the car arrester to advance, retreat or steer on a ground.

* * * * *